(12) United States Patent
Andrews et al.

(10) Patent No.: US 11,265,351 B2
(45) Date of Patent: Mar. 1, 2022

(54) DYNAMIC POLICY CREATION BASED ON USER OR SYSTEM BEHAVIOR

(71) Applicant: Dell Products L.P., Round Rock, TX (US)

(72) Inventors: Carlton A. Andrews, Austin, TX (US); Girish S. Dhoble, Austin, TX (US); Joseph Kozlowski, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 374 days.

(21) Appl. No.: 16/256,090

(22) Filed: Jan. 24, 2019

(65) Prior Publication Data

US 2020/0244704 A1  Jul. 30, 2020

(51) Int. Cl.
*H04L 29/06* (2006.01)
*G06F 8/65* (2018.01)

(52) U.S. Cl.
CPC .............. *H04L 63/205* (2013.01); *G06F 8/65* (2013.01); *H04L 63/00* (2013.01); *H04L 63/10* (2013.01); *H04L 63/102* (2013.01); *H04L 63/20* (2013.01)

(58) Field of Classification Search
CPC ....... H04L 63/205; H04L 63/00; H04L 63/10; H04L 63/102; H04L 63/20; H04L 29/06; G06F 8/65
See application file for complete search history.

(56) References Cited

U.S. PATENT DOCUMENTS

| | | | |
|---|---|---|---|
| 10,944,794 B2 | 3/2021 | Dhoble et al. | |
| 2006/0190938 A1* | 8/2006 | Capek | G06F 9/46 717/161 |
| 2008/0188187 A1* | 8/2008 | Armstrong | G06F 1/3287 455/73 |
| 2009/0327908 A1* | 12/2009 | Hayton | G06F 21/6218 715/744 |
| 2013/0247165 A1* | 9/2013 | Pal | H04L 63/102 726/10 |
| 2015/0131488 A1* | 5/2015 | Perez Martinez | H04M 15/77 370/259 |
| 2019/0258467 A1* | 8/2019 | Frantz | G06F 8/65 |
| 2019/0286498 A1* | 9/2019 | Sato | H04L 67/02 |

* cited by examiner

*Primary Examiner* — Theodore C Parsons
*Assistant Examiner* — Howard H. Louie
(74) *Attorney, Agent, or Firm* — Zagorin Cave LLP

(57) ABSTRACT

A management system manages a plurality of information handling systems by creating custom policies for each information handling system based on information gathered from or about each information handling system indicating, e.g., the user's intent, use, request for usage, security posture, productivity needs, and/or behavior. The management system creates custom policies to avoid unnecessarily impacting a user's productivity.

16 Claims, 10 Drawing Sheets

DYNAMIC POLICY CREATION BASED ON USER OR SYSTEM BEHAVIOR

BACKGROUND

Field of the Invention

This invention relates to information handling systems, and more specifically to dynamic policy creation based on user or system behavior.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An ecosystem of networked IHSs often benefits from being in a managed information technology (IT) environment. A centralized management solution helps to reduce the total cost of ownership associated with the IHSs by increasing the automation of deploying and maintaining them. A centralized management solution also drives conformance to security requirements and thereby reduces the risks associated with connected IHSs that need to be monitored and protected from unauthorized access, need access to protected corporate resources or other performance vulnerabilities. In a typical IT managed environment, polices are applied to the IHS when the IHS is first registered/connected to the management console and periodically refreshed. These policies remain on the IHS during its entire lifetime until a system administrator manually applies a different policy to that IHS.

SUMMARY OF EMBODIMENTS OF THE INVENTION

In order to improve the managed environment, custom policies are created for individual IHSs based on information gathered from or about the IHS.

In one embodiment a system is provided that includes a management service policy engine communicatively coupled to manage a plurality of information handling systems (IHSs) using a plurality of policies and configured to generate a first custom policy for a first IHS of the IHSs. The management service policy engine includes a memory storing a first set of program instructions executable by at least one processing device of the management service policy engine to generate the first custom policy responsive to information received by the management service policy engine regarding the first IHS, the first custom policy modifying one or more aspects of a current policy being used to manage the first IHS and overriding the current policy.

In another embodiment a method is provided that includes managing a plurality of information handling systems (IHSs) using a management service policy engine. The management service policy engine is communicatively coupled to the plurality of information handling systems and manages the IHSs using a plurality of policies, the plurality of policies including a current policy being used to manage a first IHS of the IHSs. The method further includes generating a first custom policy for the first IHS responsive to information received by the management service policy engine regarding the first IHS, the first custom policy replacing the current policy. The method further including managing the first IHS using the first custom policy.

In another embodiment a system is provided that includes a plurality of information handling systems (IHSs) including a first IHS configured to supply telemetry information. A management service policy engine is communicatively coupled to the IHSs. The management service policy engine includes a memory storing program instructions executable by at least one processing device of the management service policy engine to generate a custom policy for the first IHS responsive to the telemetry information, the custom policy overriding a current policy being used to manage the first IHS.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Increasingly, consolidated management services are being called upon to orchestrate new business processes to support workforce transformation by automating Information Technology (IT) processes to secure the enterprise while maximizing employee productivity without increasing IT complexity. Modern management frameworks like Airwatch/WorkspaceOne/Intune have an advantage over traditional management frameworks (like System Center, LANDesk, Altiris) in that the device does not have to be connected to corporate network for policy deployment, software update or compliance, security posture, context or inventory status collection. Modern management systems can deploy device/user policies and get compliance reports and security context information from the device in almost realtime.

Figure 1:
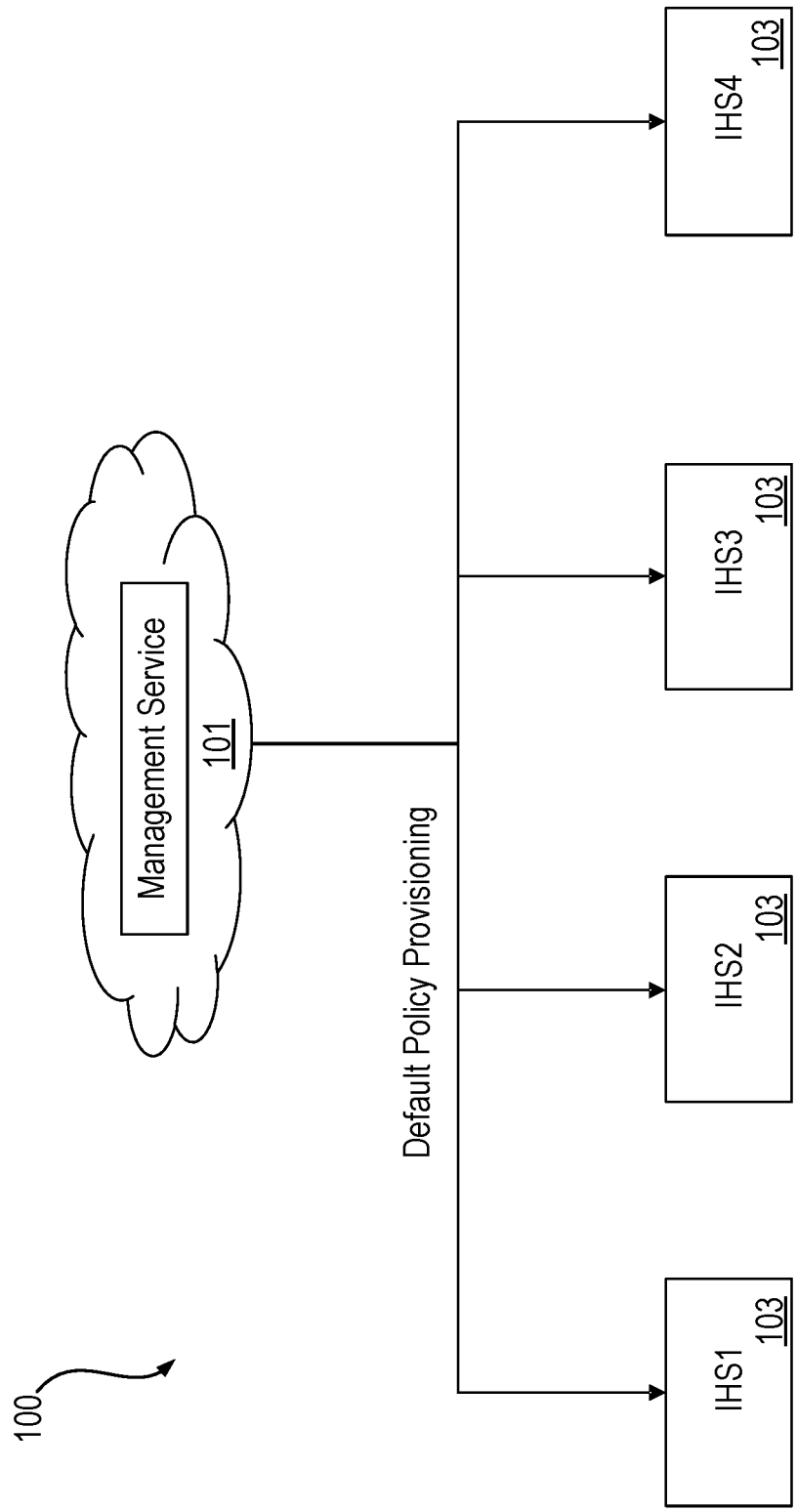
FIG. 1 is a block diagram of a managed system that includes a management service and a plurality of IHSs.

FIG. 1 is as block diagram of a managed system 100 that includes a management service 101 and a plurality of IHSs 103, which are coupled to and managed by the management service 101. The IHS can be, e.g., a laptop, desktop, server, mobile device, or any device that can be managed centrally. The management service 101 deploys an initial common default policy that is based on the organization/department to which the user of the IHS belongs. Thus, an IHS used by an employee in a finance department has a different management policy that an IHS used by an employee in a marketing department. The policy may provide, e.g., access to finance data for the finance employee and access to product data for the marketing department employee.

However, the default policy does not usually change during the device's lifetime and can impact user productivity by not taking into account information gathered from or about the IHS indicating, e.g., the IHS or IHS users intent, use, request for usage, security posture, productivity needs, or behavior. If the management system applies a highly restrictive policy on a system for its lifetime, that highly restrictive policy may result in poor usability of the system and restrict a user's productivity unnecessarily. Nowadays user productivity needs and security restriction needs vary significantly depending on where the user is, what resources they are accessing, what they need to do their job, and the machine and user behavior context, the compliance posture of the machine and user, and the local inventory of the user workspace. It is needed and necessary to have a management engine rapidly available and in command in order to alter policies in order to keep the employee most productive and the device, workspace and enterprise secure. There needs to be a balance between the restrictiveness of a policy and usability of a machine and the balance needs to be dynamic.

Workforce transformation has driven the need for cloud-based modern management and orchestration solutions. Now that management systems (Workspace One, Dell Security Service, Intune, etc) can collect information, set and trap alerts and deploy software, settings and policy in almost real-time, dynamically changing the workspace security policies and deploying or removing additional software and services (both local and as-a-service) in response to the changing threat posture, threat remediation and user productivity needs is realistically achievable. Securing the workplace while ensuring productivity can be dynamic and even support shadow-IT scenarios where users bring their own software and even hardware solutions into the managed IT environment. Policies can be continuously updated based on user productivity needs and be sequenced to permit activities in certain situations (based on data access, security posture, network location, etc.) which would otherwise be restricted and the user productivity compromised.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
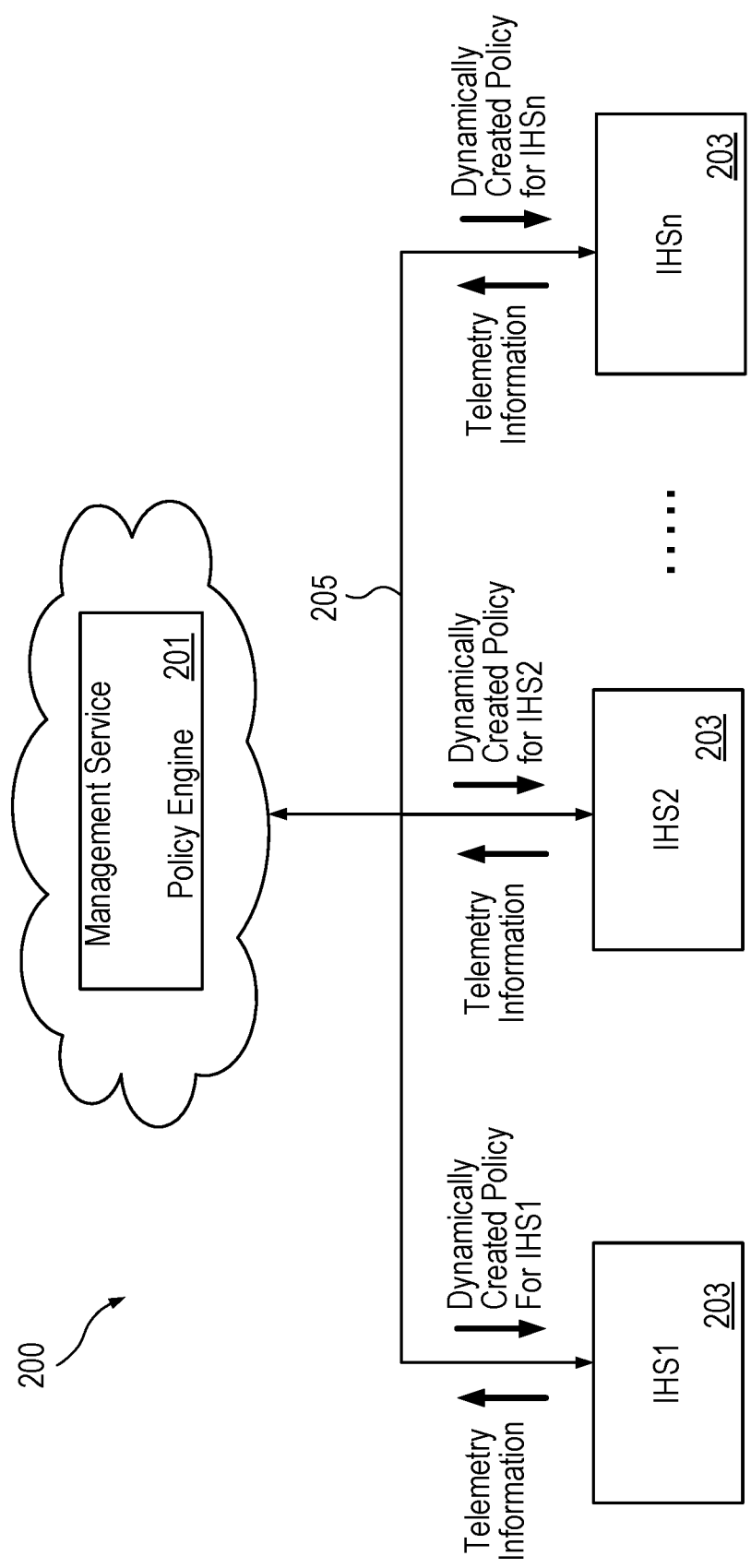
FIG. 2 illustrates a high level block diagram of a managed system according to an embodiment.

FIG. 2 illustrates a high level block diagram of a managed system 200 according to an embodiment. The managed system 200 includes a cloud based management service 201 that includes a policy engine described further herein. The managed system 200 includes a plurality of managed IHSs 203 (IHS1, IHS2, IHSn), where n is an integer that varies according to the particular needs and size of the organization being managed. Each of the IHSs 203 is coupled to and managed by the management service 201. The IHSs may be provisioned with a default policy based on employee role in the organization. In FIG. 2, management system 201 is coupled to the managed devices via a network 205. Network 205 may be a local area network (LAN), wide area network (WAN), personal area network (PAN), or any communication network allowing the exchange of information between the management service 201 and the IHSs 203. In embodiments, the network connection between the IHSs 203 and management service 201 is wired, wireless, or a combination thereof and may use any of a number of communication protocols. In addition, note that the network connection is not necessarily static. For example, the connection may be an ethernet connection while the IHS is located within the company LAN and a wireless connection when the IHS is located remote from the company. The manage service 201 receives telemetry information from the IHSs 203, and based on information received from each of the IHSs, supplies dynamically created policies based on the information received from or about the IHSs. A dynamically created policy may modify a current policy being applied to an IHS to try and reduce impediments to user productivity while maintaining appropriate security postures.

Figure 3:
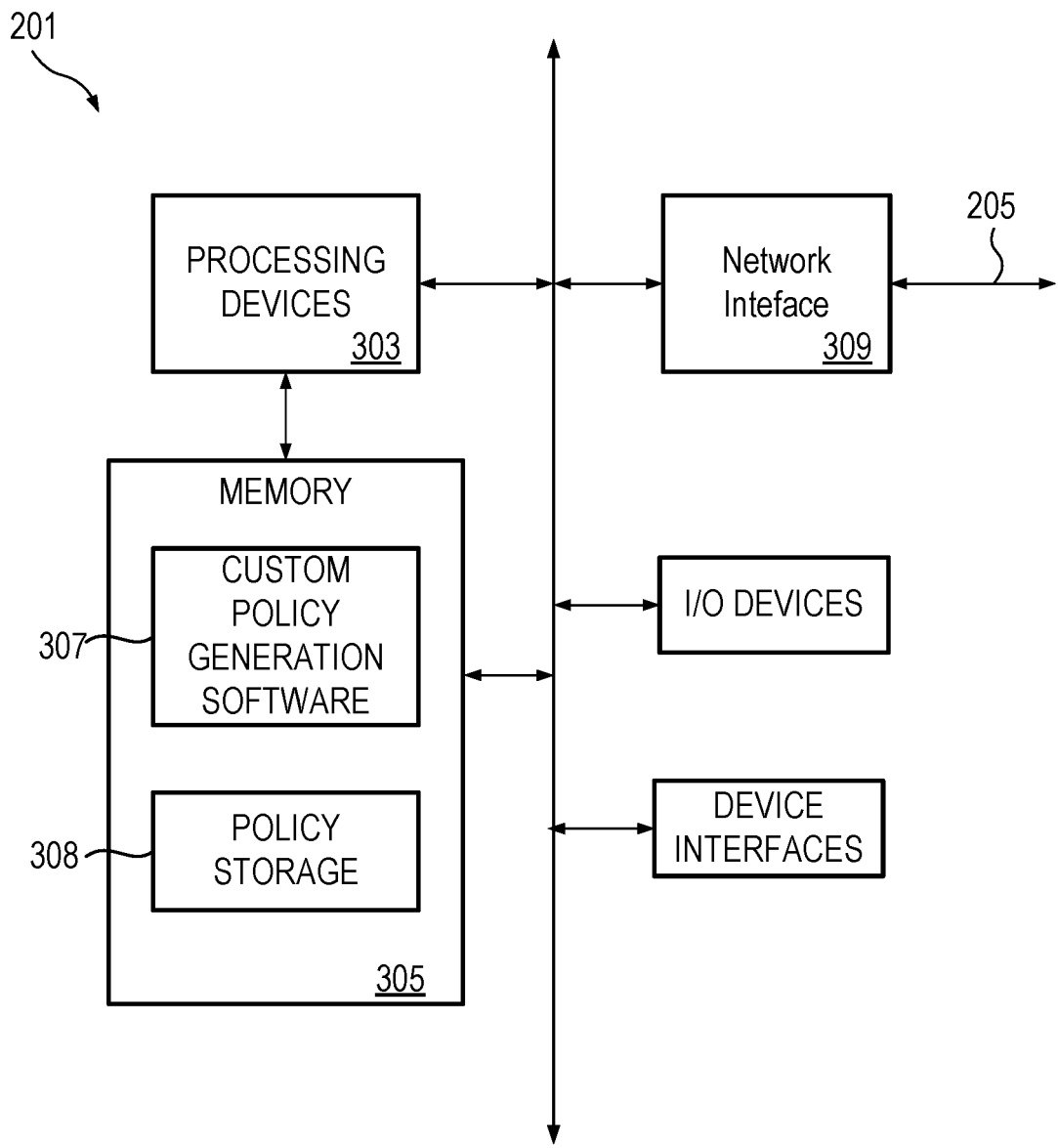
FIG. 3 illustrates a high level block diagram of an embodiment of the policy engine.

FIG. 3 illustrates a high level block diagram of the management service policy engine 201. The management service policy engine 201 includes one or more processing devices 303 programmed to administer policies for the managed IHSs including creating custom policies based on data received related to actions of the managed IHSs. The policy engine 201 includes a computer readable memory 305 containing code executed by the one or more processing devices 303 to administer the various policies. The memory 305 may include volatile memory including random access memory and non-volatile memory such as read-only memory (ROM), flash memory, non-volatile random access memory (NVRAM), or a computer readable storage device (such as, e.g., a hard disk drive or solid-state drive), and is generally configured to store policy generation software 307 to implement the custom policy generation described herein in conjunction with the one or more processing devices 303. The memory 305 further includes a policy storage 308 to store the various policies generated by the policy engine 201, e.g., in a database. Policy generation software 305 contains program instructions (or computer program code), executable by the one or more processing devices 303 to perform various steps of the methods disclosed herein. The program instructions contained within management service policy engine 201 may be written using substantially any suitable programming language including, but not limited to, Java, Python, C #, C++, and JavaScript and compiled for execution on the processing devices 303. Processing device(s) 303 may include various types and/or numbers of programmable integrated circuits (e.g., one or more processors, a controller, microcontroller, microprocessor, ASIC, etc.) and/or programmable logic devices (such as a field programmable gate array "FPGA", complex programmable logic device "CPLD", etc.). In an embodiment processing device(s) 303, include one or more central processing units (CPUs), and/or one or more graphics processing units (GPUs), each having one or more processing cores, for executing the program instructions in memory 305. The management service further includes a network interface 309 to communicate over network 205 with the IHSs and with other information sources.

According to embodiments of the present disclosure, management service policy engine 201 generates a custom policy (or a set of policies) for respective ones of the IHSs in response to information received from or about the individual IHSs. The present disclosure contemplates numerous types of custom policies to improve productivity while maintaining appropriate security postures including, but not limited to, custom policies related to software update and power settings, security scans, and access to various resources such as websites and shared drives.

Policy storage 308 stores a plurality of policies for managing the plurality of IHSs 203 operating within the managed environment. A policy is a computer representation of at least one rule or set of rules and/or restriction that causes the IHS to take/not take a particular action at a particular time or allows the IHS to have access to one or more computing resources within or external to the IHS, and/or to gain access to data and/or applications stored within the IHS or within another IHS operating within or outside the managed environment. Custom policy rules according to embodiments are applied to individual IHSs, or to groups of IHSs operating within the managed environment based on information supplied about the individual IHSs. Note that while policies may be stored in a policy database in storage 308, any storage structure suitable for storing policies may be utilized instead of, or in addition to, a database.

As non-limiting examples, policy rules may be used to control access to data stored within a computing resource of the IHS, and/or to control the decryption of encrypted data stored within the computing resource. Other policy rules may be used to control or manage logon security features (e.g., multifactor authentication, user password, etc.), control network access (e.g., to a secure or public Wi-Fi), and control access to local and/or network storage device. In other examples, policy rules may control access to input/output devices of the IHS (e.g., a camera or microphone) or control access to certain applications or websites. In yet another example, policy rules may be used to control power options set for the IHS, such as the amount of time an IHS is idle before it transitions into a power saving mode or what happens upon lid closing.

In addition to rules, the policies stored within policy rules may specify one or more actions that are taken by an IHS. Example actions include, but are not limited to, enabling/disabling I/O devices of the IHS (e.g., blocking phone calls or disabling a camera or microphone), enabling/disabling access to one or more local or remote computing resources of the IHS (e.g., enabling/blocking access to a network interface device, a computer readable memory or storage device, a processing device, etc.), enabling/disabling network access (e.g., blocking access to a secure or public Wi-Fi network), enabling/disabling access to certain applications or websites (e.g., certain applications/websites may be allowed/disallowed for certain users/locations/times), causing the pulling software updates at a particular time, performing virus scan and virus signature updates at a certain time, and configuring various security settings.

Figure 4:
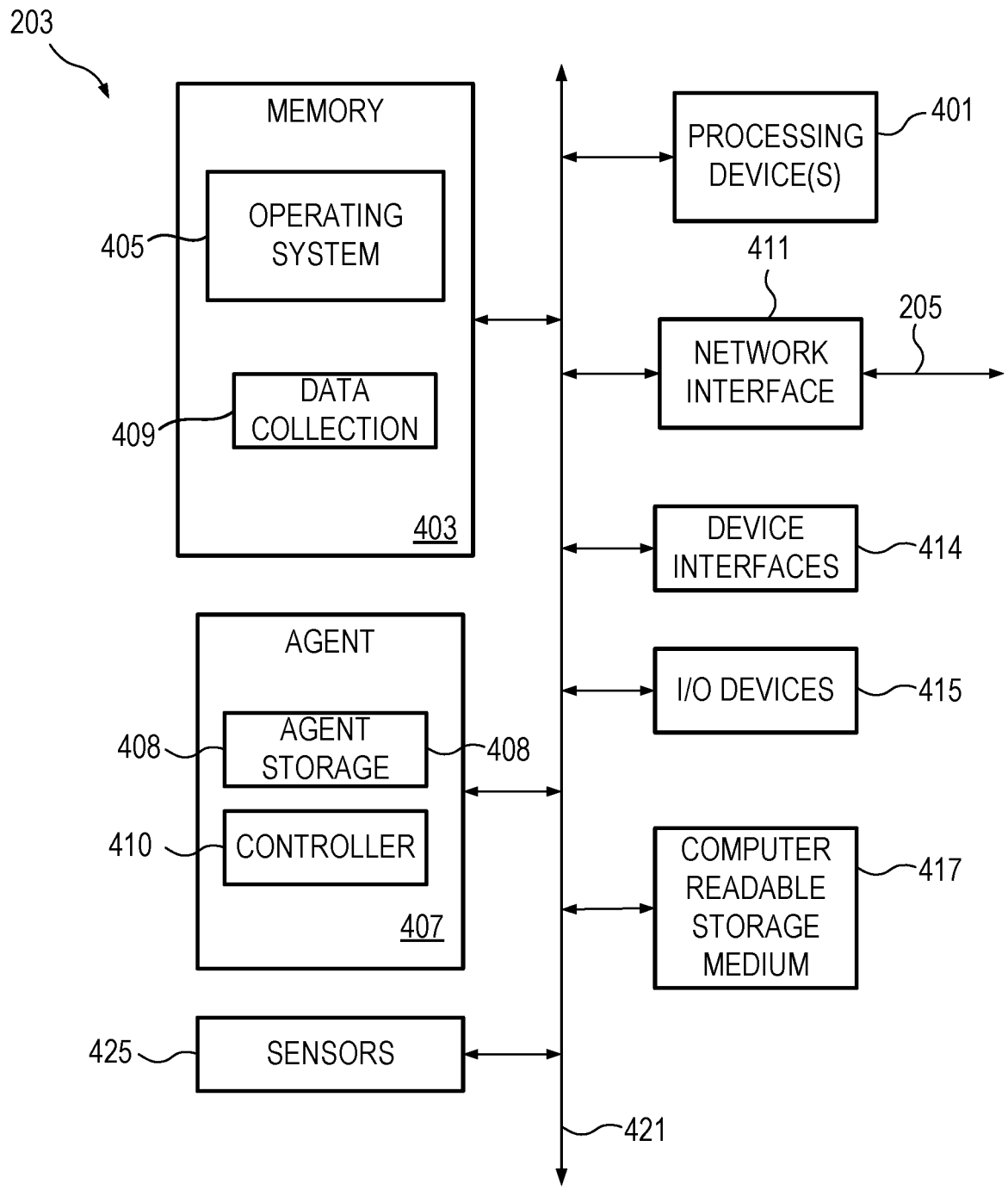
FIG. 4 illustrates a high level block diagram of an embodiment of an IHS.

FIG. 4 illustrates a high level block diagram of an embodiment of an IHS 203 that is coupled to and managed by management service 201. As shown in FIG. 4, an IHS 203 in accordance with the present disclosure includes one or more processing devices 401 and system memory 403. System memory includes the operating system 405. The IHS includes an agent 407 that operates in conjunction with the management service policy engine 201. The IHS further includes a data collection module 409 that collects and supplies telemetry information to the management system policy engine 201. As discussed further herein, the data collection module 409 interact with various portions of the operating system and other software and/or hardware in the IHS to obtain and provide relevant telemetry information to the management service policy 201. In addition, IHS 203 may include one or more network interface device(s) 411, one or more device interface(s) 414, one or more I/O device(s) 415 and one or more computer readable storage medium(s) 417. Processing device(s) 401, system memory 403, network interface device(s) 411, device interface(s) 414, I/O device(s) 415, and computer readable storage medium(s) 417 are coupled to system interconnect 421 for communicating signals and data there between. System interconnect 421 may represent one or more buses, interfaces, hubs and/or controllers that are used to transfer information between the various system components. Other components not specifically shown in FIG. 2 may also be included within the information handling system 203.

The one or more processing devices 401 shown in FIG. 4 may be configured to execute program instructions stored within system memory 403 and/or computer readable storage medium 417. Examples of processing device(s) 401 include various types of programmable integrated circuits (e.g., a processor, a controller, microcontroller, microprocessor, ASIC, etc.) and programmable logic devices (such as a field programmable gate array "FPGA", complex programmable logic device "CPLD", etc.). According to one embodiment, processing device(s) 401 include a central processing unit (CPU) having one or more processing cores. In some embodiments, processing device(s) 401 include other types of processing devices including, but not limited to, a graphics processor unit (GPU), and/or a digital signal processor (DSP).

Network interface device(s) (NID) 411 enables IHS 203 to communicate with other devices, systems and/or services via network 205 using one or more communication protocols. As noted above, network 205 may be a local area network (LAN), wide area network WAN), personal area network (PAN), or the like, and the connection between IHSs 203 and management service 201 may be wired, wireless or a combination thereof. In the embodiment shown in FIG. 4, network interface device(s) 205 transmit telemetry information to, and receive policy related information from, management service 201 using any known communication protocol.

Device interface(s) 414 may generally include one or more communication interfaces or ports, which provide physical connection to and enable communication with external devices and cables. Examples of device interface(s) 414 include, but are not limited to, a Universal Serial Bus (USB) interface, a card reader, a Personal Computer Memory Card International Association (PCMCIA) port, and a high-definition multimedia interface (HDMI).

Input/Output (I/O) device(s) 415 may include any input device and/or output device provided on, within or coupled to an IHS. Examples of input devices include, but are not limited to, a keyboard, mouse, touch screen, touch pad, microphone, and a camera. Examples of output devices include, but are not limited to, a computer monitor, a display device, printer, or audio speaker(s). In some embodiments, I/O device(s) 415 may include one or more optical disc drives, such as a compact disc (CD) drive, digital video (DVD) disc drive and/or Blu-ray disc drive (BD).

Computer readable storage medium 417 is generally configured to store user data and applications. The applications stored within computer readable storage medium 417 may contain program instructions (or computer program code), which may be executed by processing device(s) 401 to perform various tasks and functions for the information handling system and/or for the user. According to one embodiment, computer readable storage medium 417 may comprise one or more hard disk drives (HDDs) or solid-state drives (SSDs).

Agent 407, or portions thereof, may operate in a secure environment resistant to security attacks and other modifications by isolating agent components from other hardware and/or memory components of the IHS. Agent 407 may further include a separate hardware controller 410, e.g., a microcontroller to provide agent functionality in addition to, the one or more processors present in the IHS. Although not shown in FIG. 4, agent 407 may be directly connected (e.g., wired) to some or all of sensors 425, and therefore, may receive an unadulterated stream of data from sensors 425 that cannot be changed or spoofed by malicious software. Agent 407 may be coupled to sensors 425 through communication path 421.

Agent 407 receives policy rules from policy engine 201 to be applied to IHS 403, and is responsible for ensuring the actions necessary to effectuate policies described further herein are performed by the IHS. Agent 407 includes program instructions (or computer program code), which may be executed by processing device(s) 401 or controller 410 to effectuate the new policy or policies at the direction of policy engine 201. Agent 407 also stores policy related information in agent storage 408. Such actions performed by the agent include adjusting power policies by, e.g., setting a wakeup timer, changing browser security configurations, requesting software updates, changing default browsers, or configuring scan time or other relevant actions to accomplish the desired policy set by the management service. In some embodiments, the agent memory 408 is loaded with a default policy (or set of policies), which were applied to the IHS when the IHS was first registered/connected to the management framework. When a new or modified policy (or set of policies) is received from management service 201, the new policy is stored within agent storage 408 as a set of rules and used to manage the IHS. Note that while shown separately, the agent storage 408 may in fact be part of system memory.

In addition to storage 408, in embodiments agent 407 further includes a controller 410 to execute some or all of the functions performed by agent 407. The controller, which may be implemented in a variety of ways, including hardware, software and/or firmware implementations. In some embodiments, controller 410 includes an embedded controller (EC) or a dedicated microcontroller. In other embodiments the one or more processors 401 within the IHS execute code to implement the functions of agent 407.

Sensors 425 may include one or more platform level sensors configured to generate data pertaining to operation of the IHS. Sensors 425 are implemented in hardware and/or software and may be configured to provide substantially any data that is relevant to system operation including security related information. As non-limiting examples, sensors 425 may be configured to detect a communication state of a network interface device 411 (e.g., detecting network connectivity, or connection to a particular network), a connection state of a network interface device 411 (e.g., detecting the presence of a USB drive attached to a USB port), a connection state of a I/O device 415 (e.g., detecting a connection to a printer, camera, microphone, etc.), a physical location of the IHS (e.g., detecting a GPS location of the IHS), a power or docking state of the IHS, and/or an intrusion into a chassis of the IHS. As further examples, sensors 425 may be configured to detect corruption of program code or data within a Basic Input/Output System (BIOS) of the IHS, a measured boot violation (e.g., detecting configuration and/or boot process changes to the IHS), multiple incorrect password attempts, state changes in the Trusted Platform Module (TPM), and/or other hardware-level abnormal behavior (e.g., an uncharacteristically large number of reads/writes to the same memory location). Other types of operational related data not specifically mentioned herein may also be generated by sensors 425.

System memory 403 including, (e.g., RAM, ROM and/or cache memory) may be configured to store a plurality of software and/or firmware modules, including but not limited to, operating system (OS) 405, and data collection module(s) 409. The software and/or firmware modules stored within system memory 403 contain program instructions (or computer program code), which are executed by processing device(s) 401 to instruct components of IHS 203 to perform various tasks and functions for the information handling system, as well as to perform various steps of the methods disclosed herein. Although illustrated as OS-level services in FIG. 4, it is noted that data collection module(s) 409 may operate outside of the OS, in some embodiments. For example, data collection module(s) 409 may alternatively be stored within computer readable storage medium 417 and executed by processing device(s) 401 to perform various tasks described herein.

Data collection module(s) 409 may generally include one or more data collection modules, which are configured to collect data pertaining to the IHS. In one embodiment, data collection module(s) 409 may contain program instructions (computer program code), which may be executed by processing device(s) 401 to collect both current data and historical data pertaining to the IHS, e.g., charging and idles times.

In some embodiments, data collection module(s) 409 receives data from sensors 425 and controller 410. For example, data collection module(s) 409 may receive a current GPS location or a current network connection state of the IHS from sensors 425 and controller 410. In some embodiments, data collection module(s) 409 receives other types of current, platform specific information, including but not limited to, data pertaining to system health, internal temperature, connected peripherals, etc. In some embodiments, data collection module(s) 409 may be configured to collect additional information pertaining to the IHS, and/or additional information pertaining to the user of the IHS. The information includes, by way of example, software installs and updates (including, e.g., current OS version, anti-virus software installs and updates, and application/software inventory, including application/software known to be vulnerable), memory information, hardware information, application level logs, calendar events, user roles, etc., from operating system 405. Dell Command Monitor (DCM) is one example of a data collection module, which is installed as an OS-level service on Dell PCs to collect current data pertaining to the PC. Although the DCM may be included and used to collect data pertaining to the IHS in some embodiments, other data collection modules may be used to perform such function in other embodiments.

In some embodiments, data collection module(s) 409 may aggregate the data collected over time into historical data, which may be used to determine user/device behavioral patterns. In addition to the information described above, data collection module(s) 409 may aggregate and collect historical information pertaining to CPU usage and idle time, storage usage, network usage, docking and charging behavior, etc. In addition, data collection module(s) may store historical information on the type of data or classification of data accessed by location, attempts to access resources network connection, region, etc., in conjunction with other metrics, such as other data/application accesses, time of day, etc. Dell Data Vault (DDV) is one example of a data collection module, which is installed as an OS-level service on personal computers (PCs) to collect historical data pertaining to the PC, generate user/device behavioral patterns. Although the DDV may be included and used to collect historical data pertaining to the IHS in some embodiments, other data collection modules may be used to perform such function in other embodiments.

The agent or other component in the IHS causes the data collected by the data collection module(s) 409 to be sent as telemetry information to the policy engine on a periodic basis over network 205. The period may be daily, hourly, or more frequently based on such factors as whether a network connection is available, whether new collected data is available, and on criteria established by the management service policy engine 201 regarding the desired frequency of telemetry information.

The present disclosure contemplates various embodiments of methods that may be used to dynamically update a policy (or a set of policies) applied to one or more IHSs 203 coupled to and managed by a management service 201 in response to changes in user/device context and/or behavioral patterns. Example embodiments of the methods contemplated herein are illustrated in the diagrams of FIGS. 5A-8.

Generally speaking, the methods contemplated herein are computer implemented methods performed, at least in part, by execution of the program instructions contained within policy engine 201. Unlike conventional management systems, which either fail to update policies applied to an IHS based on the unique needs of the IHS, or require manual input from a system administrator to do so, the computer implemented methods described herein improve the way in which an IHS functions by creating a custom policy applied to the IHS in response to behavioral patterns and/or changes in user/device needs. By creating custom policies responsive to the needs of individual IHSs (or a group of IHSs) that replace and override a current policy or policies being used to manage the IHS (or group of IHSs), the systems and methods described herein reduce impact on user productivity without adversely affecting device/network security. Thus, existing policies are dynamically modified to better meet the needs of the IHSs being managed.

Figure 5A:
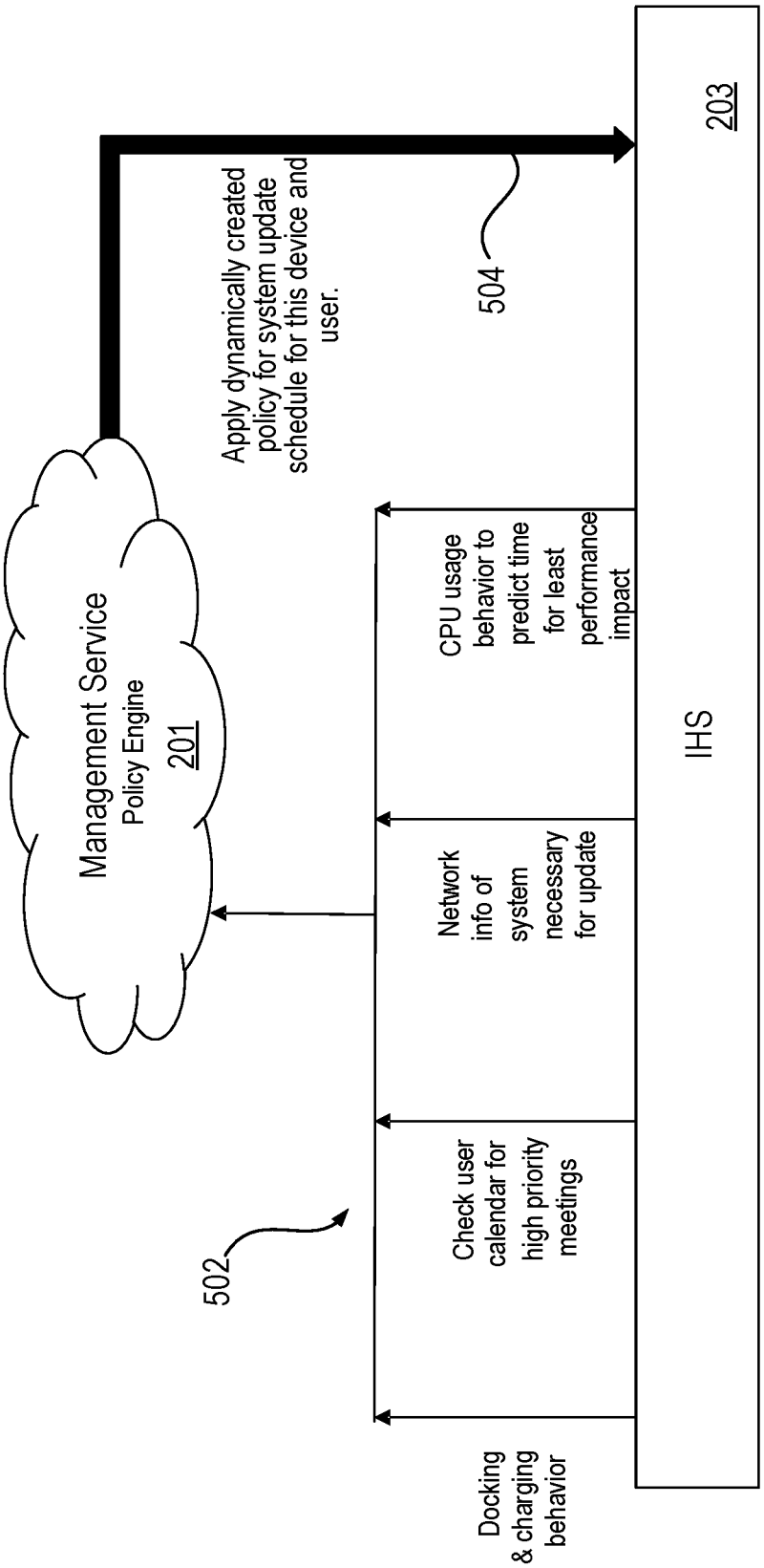
FIG. 5A illustrates an embodiment of information flow between an IHS and the management service policy engine for dynamically generating a custom policy relating to software updates.

One such custom policy adjustment relates to software update policies and power policy settings based on user needs and IHS usage. For example, in current managed systems, IHSs may be forced to get a lengthy software update tying up the IHS during the workday, which can result in significant productivity losses. FIG. 5A illustrates the information flows between the management service policy engine 201 and the IHS 203. The IHS generally provides information 502 and the management service policy engine supplies policy rules to apply a dynamically created custom policy in 504 that overrides the current policy being used to manage IHS.

Figure 5B:
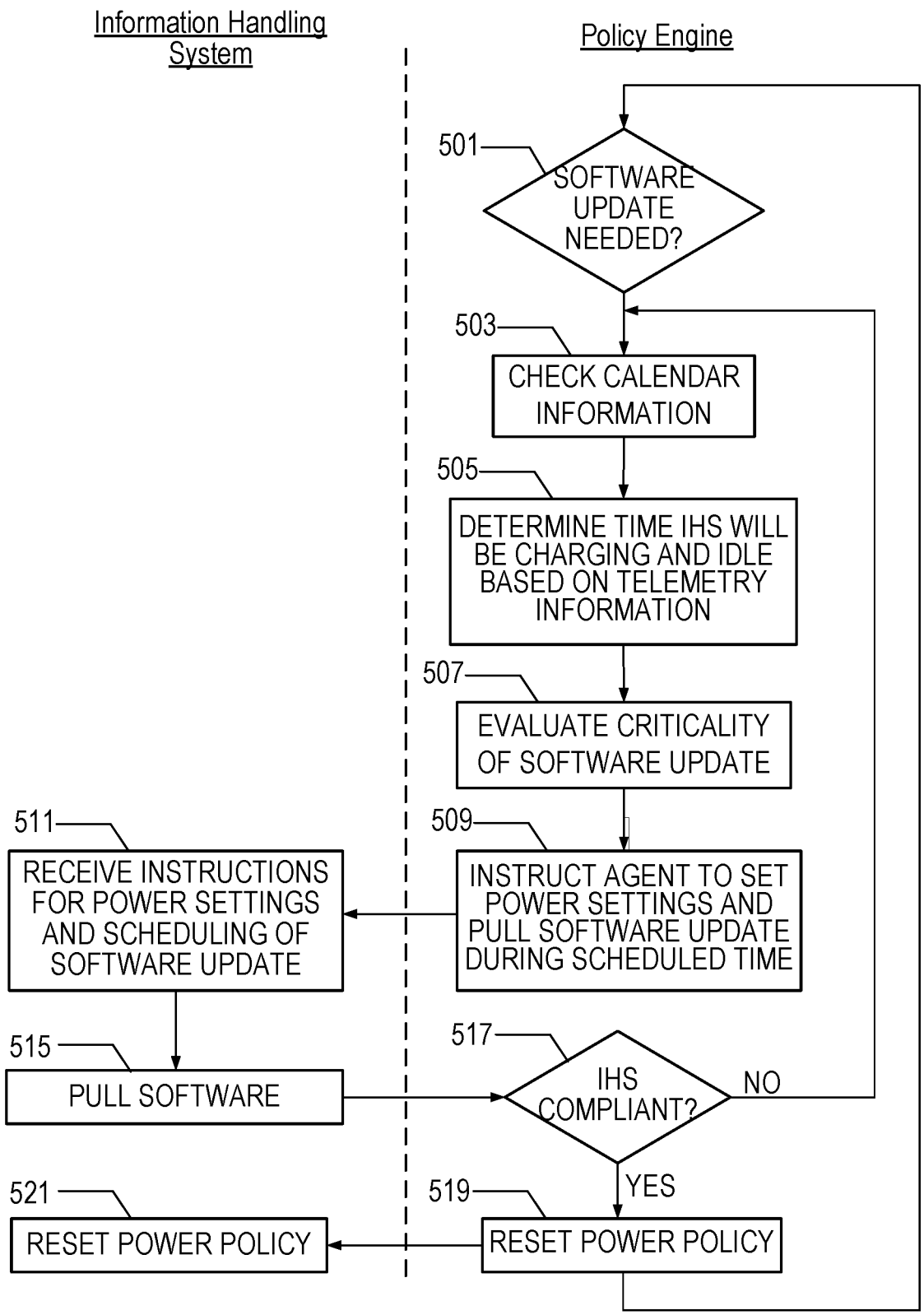
FIG. 5B illustrates a flow diagram illustrating generation of a custom policy for software updates according to an embodiment.

FIG. 5B illustrates a flowchart diagram illustrating one embodiment of a method to dynamically create software update policies and power policy settings based on user needs and the actions that occur in the policy engine and the IHS. The software to be updated may be operating system software or application software running on the IHS being managed. When the policy engine determines a software update is needed in 501, the policy engine evaluates a variety of telemetry information provided by the IHS being managed. The policy engine may also obtain relevant information from sources other than the telemetry information provided by the policy engine. That information can include calendar information, which is checked in 503 to determine if the user of the IHS has any meetings scheduled. The calendar information may be used to evaluate the priority of a scheduled meeting based, e.g., on the role in the organization of the IHS user or the role in the organization of other meetings attendees. The more senior the role, the higher the importance of the meeting. Thus, the method tries to avoid scheduling a software update during an important meeting, to reduce impact on user productivity. The calendar information may be provided by the IHS or obtained by the policy engine from the mail and calendaring software being utilized by the organization whose IHSs are being managed.

The telemetry information provided by the IHS includes historical docking and charging behavior and CPU usage and in step 505, based on that telemetry information, the policy engine determines a likely time that the IHS will be charging and idle for an hour or other predetermined time period for the software update. The size of the software update may influence the predetermined time period required for the IHS to be idle to receive the software update without impacting productivity.

In step 507, the policy engine also evaluates the criticality of the update. Some software updates are more critical than others and fix software vulnerabilities that cannot be allowed to remain for any length of time on the managed IHSs. The more critical the update, the more willing the policy engine is willing to impact user productivity. If the update is above a threshold criticality, the update will occur as soon as possible.

Once the policy engine determines an appropriate update policy based on the steps 501 through 507, the policy engine in 509 communicates information to the IHS to cause the power settings to be adjusted to ensure the IHS is awake just prior to the time set for the update and to schedule the software update. After receiving the update and power policy from the policy engine in 511, the agent 407 (FIG. 4) ensures the system is awake to perform the update by, e.g., setting a timer (or causing a timer to be set) in the IHS to wake the system at the proper time and schedules the software update. In 515 the agent causes the managed IHS to pull the software update at the time selected to reduce impact on productivity. In 517 the policy engine checks compliance status a suitable amount of time after the software update was scheduled to ensure that the software update was successfully completed. If the software update was not successfully completed, the method returns to 503 to reschedule the software update. If successfully completed, the policy engine resets the power policy to its prior setting or a default setting in 519 and communicates the updated power policy to the IHS and returns to 501 to await the next software update. In 521 the IHS resets the power policy as instructed by the policy engine. Thus, the policy engine has provided a custom software update and power policy based on the latest telemetry information available to balance productivity needs and security requirements. Given the nature of today's workforce, the ability to customize the software update policy and power policy for each IHS allows individual work habits and location to be taken into account and a unique sequence of events executed to reduce impact on user productivity.

Figure 6:
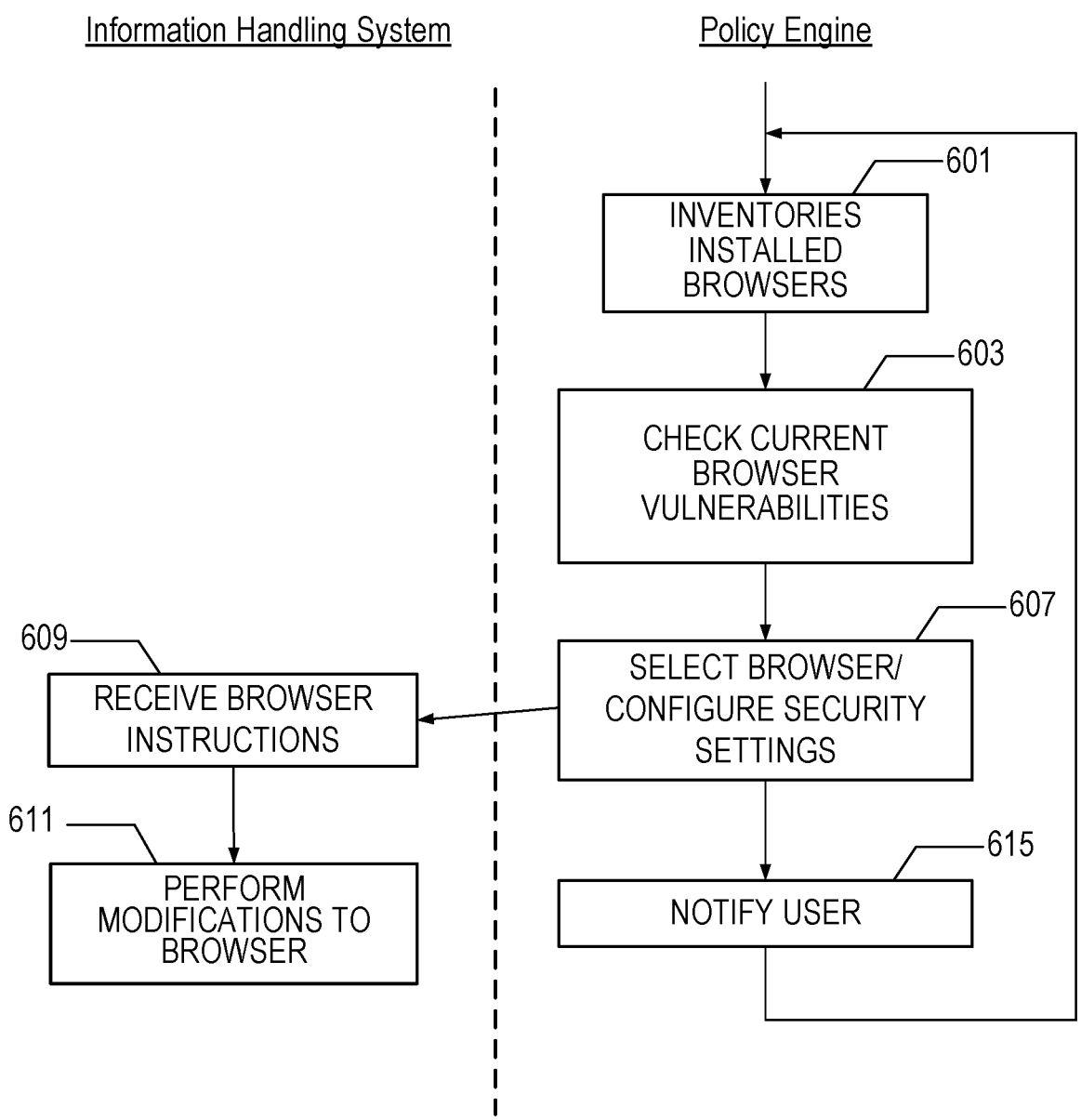
FIG. 6 is a flow chart illustrating how the policy engine creates a custom browser policy for individual users based on telemetry and other information available to the policy engine according to an embodiment.

FIG. 6 provides another example of how the policy engine creates custom policies for individual users based on telemetry and other information available to the policy engine. Browser vulnerability varies over time and usage. The policy engine inventories the installed browsers on the managed IHSs in step 601. The installed browsers may be part of the telemetry information provided by the IHS or information requested by the policy engine. In 603 the policy engine dynamically checks the currently known browser vulnerabilities of browsers such as Edge, Internet Explorer, Chrome, FireFox, etc. That information can be checked on third party sites. In step 607 the policy engine selects a browser for a particular IHS based on such factors as identified IHS security posture, user location, user network, and update status. The security posture may be based on user location and the network to which the IHS is currently attached. For example, for an IHS on a secure LAN within a company and receiving all external traffic through additional firewall protection, the default browser may be left intact as the vulnerability is known to be protected by the additional firewall protection. However, for an IHS in a public area on a non secure network the choice of browser may be restricted based on known browser vulnerabilities.

Further, as part of selecting a browser, the policy engine checks in 607 on the update status of the browser on the IHS, and, in some embodiments, the update status on anti-virus software, which may, e.g., have included specific detection for a recently uncovered browser threat in a most recent update. The policy engine may change browser security configurations based on user browsing patterns provided in the telemetry data. For example, if browsing patterns, e.g., over the last week or month or other appropriate time frame, indicate a limited number of websites have been accessed and these websites were considered safe, the security configurations for the browser may be left at a moderate level. If the browsing history indicates website access to websites whose risk is unknown or are considered dangerous, the policy engine may cause the browser security configurations to be set at a higher level. In certain situations, the policy engine changes the default browser to a more secure browser based on the factors considered above. In some circumstances, the policy engine disables other browsers or a browser considered to be at risk to prevent the user from switching from the default browser to a risky browser.

In 609 the IHS receives the browser instructions and in 611 the agent causes the updated browser policy to be implemented in the IHS including updated browser security settings, disabling browsers, and/or changing the default browser. The policy engine may notify the user in 615 of the change in default browsers or the disabling of other browsers to make the user aware that the change in the functioning of the IHS was intentional and not a software failure. If the IHS does not have the desired default browser installed, the policy engine may cause the default browser to be downloaded and installed on the IHS. Thus, the policy engine creates a custom browser policy based on such factors as user behavior, location, history, and browser vulnerability.

Figure 7:
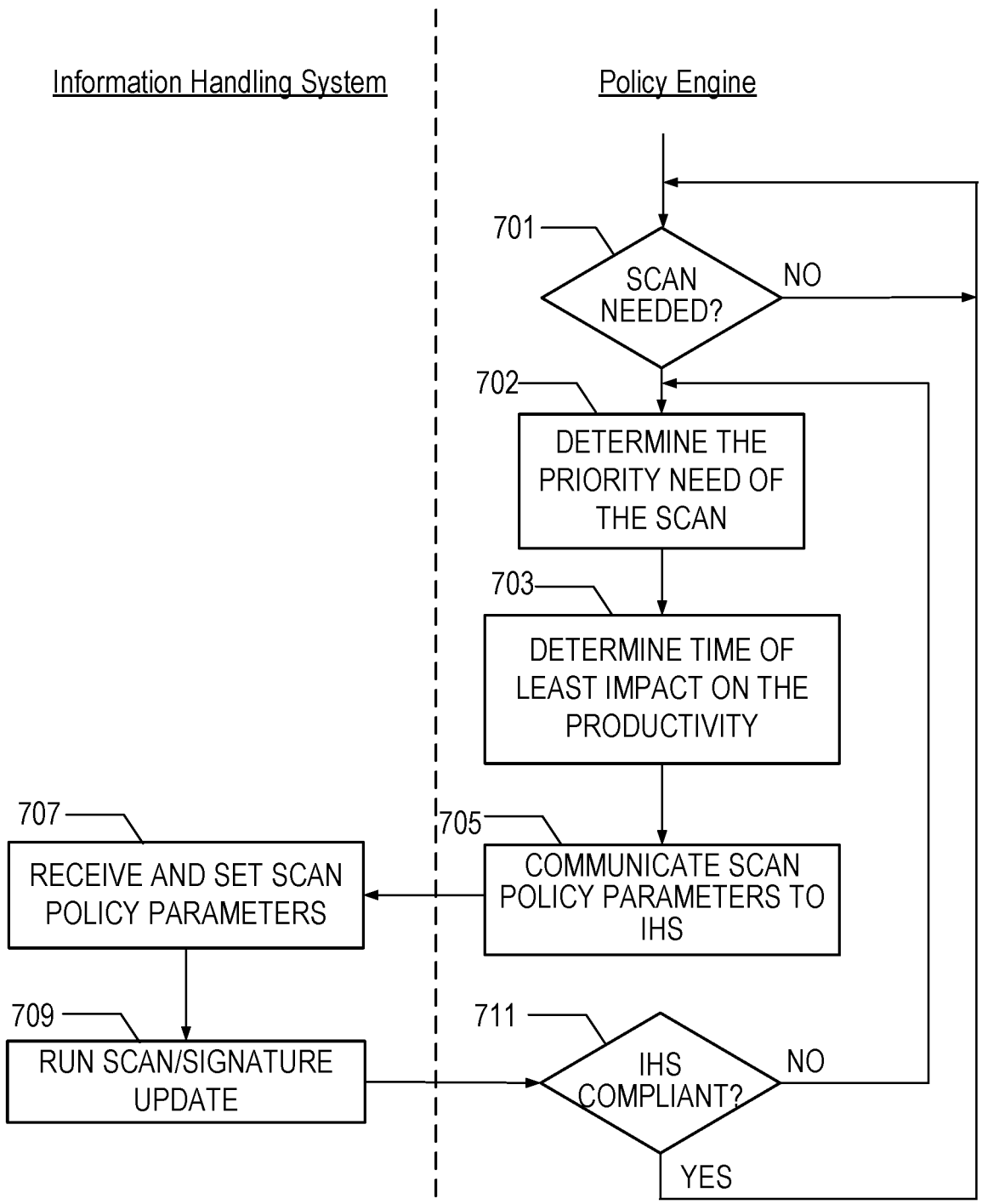
FIG. 7 illustrates a flow chart for creating a custom anti-virus scan/signature update setting according to an embodiment.

FIG. 7 illustrates another example of generation of a custom policy based on user habits. FIG. 7 illustrates a method of adjusting the anti-virus scan/signature update setting based on user convenience and system readiness. In many organizations, the IT department sets the anti-virus scan/signature update to a time that the IT department knows will likely be successful. Thus, scanning during the daytime on a weekday can be common because the IHS is likely to be available. However, such timing can negatively impact productivity. Thus, the ability to customize the anti-virus scan/signature update time based on telemetry information received from each IHS can reduce negative impacts on productivity. In 701 the policy engine determines whether a scan is needed and if a scan is needed, the policy engine determines the priority need of the scan in 702. For example, a known ransomware risk within the network, e.g., a Wannacry infection in the network may have a high priority as compared to a regular scan, so the policy engine may ignore or deemphasize the impact to productivity in determining an appropriate anti-virus scan/signature update time. In fact, a high priority risk may cause a scan at the first opportunity. In 703 the policy engine determines based on the telemetry information provided by the IHS, the time of least impact on productivity of the user associated with the IHS. The productivity impact can be determined based on such factors as a time that has the least CPU usage, a time when the IHS is docked and asleep, and include analysis of meeting schedule or other calendar based analysis). In 705 the policy engine communicates the scan parameters so the agent can trigger the IHS to wake and scan at the determined time trigger based on priority need and user convenience evaluation. The IHS receives the scan policy parameters in 707 and sets appropriate triggers to wake the IHS and perform the scan/signature update at the selected time in 709. The policy checks in 711 whether the IHS is compliant based on information supplied by the IHS or based on a failure to receive confirmation from the IHS. If compliant, the policy engine returns to await the need for the next scan. If not compliant, the policy engine returns to reschedule the scan starting in 702. Thus, the policy engine balances user productivity and security needs in creating custom policies for the IHSs being managed. Note that although not shown in FIG. 7, after the scan is run, the IHS may return the scan parameters to a default value or use the updated scan parameters as the current default parameters.

Figure 8A:
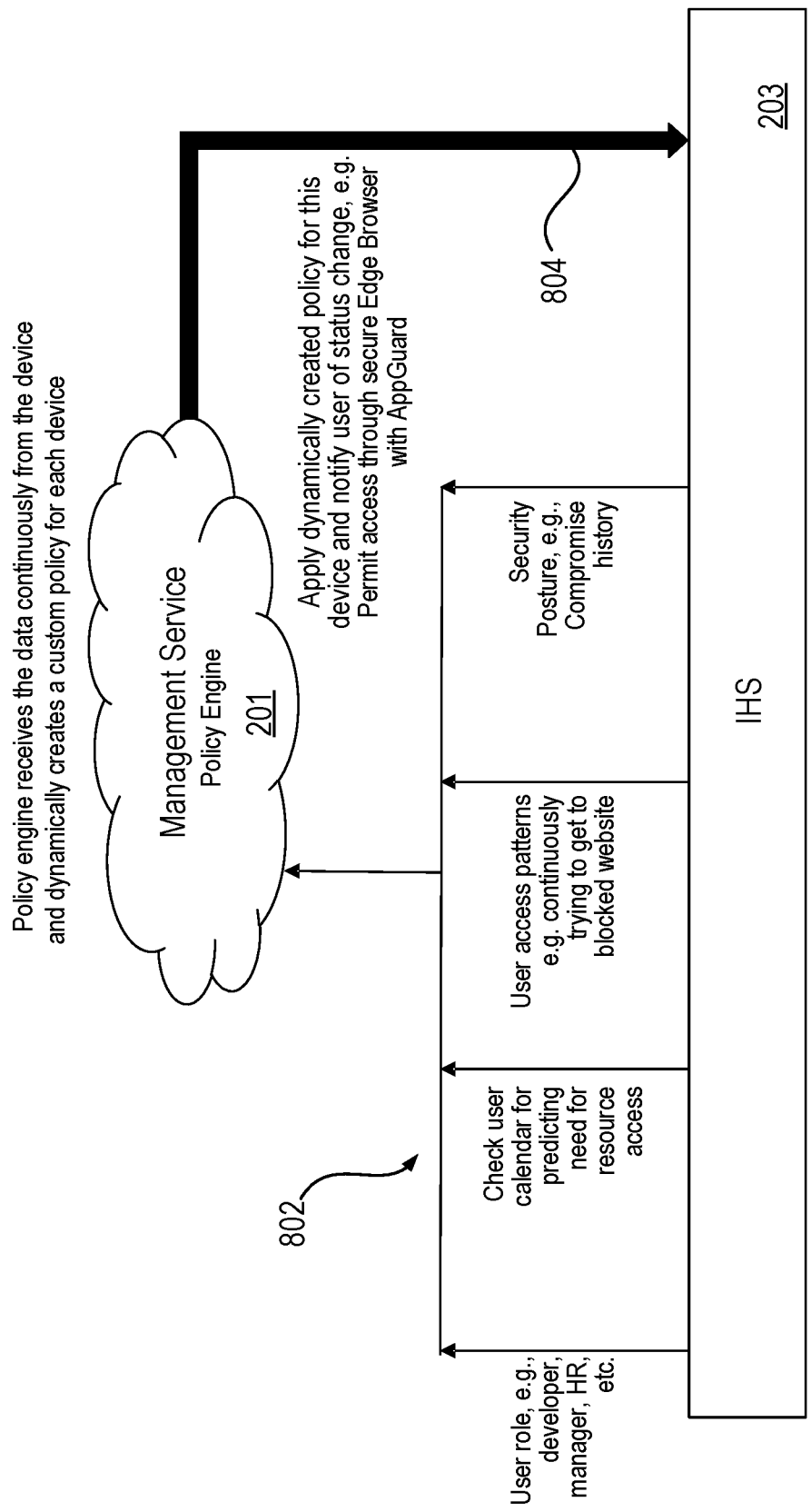
FIG. 8A illustrates an embodiment of information flow between an IHS and the management service policy engine for dynamically generating a custom policy relating to resource access.

FIG. 8A illustrates the information flows between the management service policy engine 201 and the IHS 203. The IHS generally provides information 802 and the management service policy engine supplies policy rules to apply a dynamically created custom policy for IHS 203.

Figure 8B:
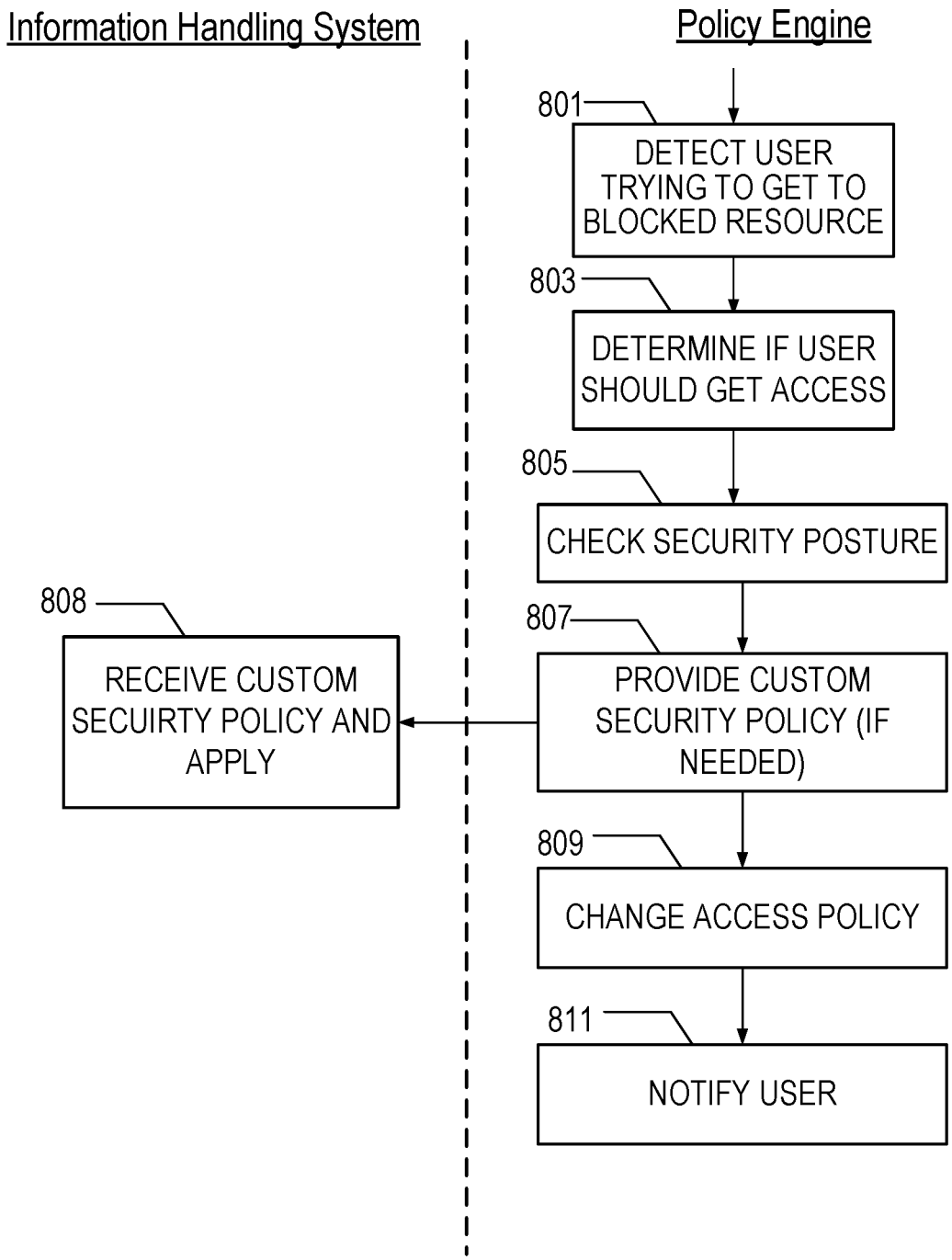
FIG. 8B illustrates a flow chart for creating a custom resource access policy according to an embodiment.

FIG. 8B illustrates another example of creating a custom policy per IHS by adjusting an IHS user's access to resources such as shared drives, websites, etc. FIG. 8B illustrates a method of utilizing the information available to policy engine 201 to create a custom access policy for the IHS. Assume a company has a proxy policy that limits a user's access to certain resources. For example, a particular website may be blocked by a company proxy that uses a DNS redirect to redirect the access to attempt to a different DNS, e.g., resulting in displaying a blank page. In 801 the policy engine detects that the user is trying to access a blocked website or other resource that the user is unable to access. The management service may receive user access patterns in the telemetry data from the IHS (or from another source) indicating that the user is continuously trying to access a blocked resource. That information may be provided to the policy engine from an IT source or from the IHS. The attempted access to a blocked website or other resource may occur, e.g., because the user is working on a task involving a company associated with the blocked website or other resource.

In 803 the policy engine determines whether the user should be entitled to the blocked resource. The decision is based on, e.g., job function, title, active directory group, etc. Thus, the decision to allow access depends on such factors as the user role within the organization and the security posture that needs to be maintained with respect to the access. The policy engine 201 (FIG. 2) receives data periodically from the IHS 203 (or about the IHS 203 from another source). The data includes, e.g., the user role within the organization. The user role may be developer, manager, a member of a particular department, or any of a large number of functions within a particular organization. In addition, the seniority of the person within the organization can be determinative of whether to grant access to the resource. Thus, e.g., a new hire may get less access to resources than a senior manager. In addition, the policy engine may check the calendar of the user to determine scheduled meetings or trips that may be relevant to access to the blocked resource.

In 805, the policy engine checks the security posture of the IHS. Thus, e.g., the policy engine checks antivirus status of the IHS to ensure the antivirus software is up to date. If not, the policy engine may update the anti-virus rule set prior to granting access to the blocked resource. The policy engine may dynamically change configuration of an anti-virus solution based on user role, behavior, international travel, etc. For example, in an embodiment the policy engine permits access to the blocked website but only through a particular browser with security software such as AppGuard enabled and with white/blacklist policy set to secure exposure.

Assuming that after evaluating the user role and security posture in 803 and 805, the policy engine decides to allow access to the blocked resource, the policy engine provides the custom security policy, if needed, for access to the blocked resource to the IHS in 807 and the IHS receives and applies the custom security policy if needed in 808. The policy engine changes the access policies, e.g., the proxy policies in 809 to enable access to the needed website and/or ports. Finally, in 811 the policy engine notifies the user of the change in access and any needed information by the user, e.g., what browser to use, to access the previously blocked resource.

Thus, the policy engine dynamically generates custom policy taking into account user productivity needs and security requirements. An initial or default group policy may be modified for each user or group of users to provide a custom policy sequence based on user productivity needs and user data/behavior. Thus, a custom policy created for the examples described above may be applied to more than one IHS, for example to a subgroup of a larger group having an initial default policy. The custom policies are created and delivered to the IHS in real-time based on information continually provided to the policy engine from (or about) the IHS. In addition, an appropriate security posture is maintained over user and environmental changes with limited productivity impact.

Thus, various aspects have been described related to dynamic policy creation based on user needs or system behavior. The description of the invention set forth herein is illustrative, and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. A system comprising:
    a management service policy engine communicatively coupled to manage a plurality of information handling systems using a plurality of policies and configured to create a first custom policy for a first information handling system (IHS) of the information handling systems;
    the management service policy engine including a memory storing a first set of program instructions executable by at least one processing device of the management service policy engine to generate the first custom policy responsive to information received by the management service policy engine regarding the first IHS, the first custom policy modifying one or more aspects of a current policy being used to manage the first IHS and overriding the current policy;
    wherein at least some of the information received by the management service policy engine regarding the first IHS, and used to generate the first custom policy, is telemetry information received by the management service policy engine from the first IHS; and
    wherein the management service policy engine is configured to determine, based at least in part on the telemetry information, a first time that the first IHS will be charging and idle for a length of time sufficient to receive a software update, and the management service policy engine is configured to communicate with the first IHS to cause power settings to be set on the first IHS to ensure that the first IHS is not sleeping just prior to the first time and to cause the first IHS to request the software update during the first time.

2. The system as recited in claim 1, wherein the first custom policy includes a software update policy and a power policy based on the telemetry information to reduce impact on user productivity.

3. The system as recited in claim 1,
    wherein the first custom policy allows access to a resource that is blocked in a previous policy, the first custom policy being generated responsive to, in part, detection of the first IHS trying to access the resource; and
    wherein the management service policy engine is configured to notify the first IHS that access to the resource has been granted.

4. The system as recited in claim 3, wherein the management service policy engine is configured to evaluate one or more of user job function, user title, or active directory group in deciding to allow access to the resource.

5. The system as recited in claim 1, wherein the first custom policy changes a default browser used by the first IHS.

6. The system as recited in claim 5, wherein the first custom policy disables one or more additional browsers.

7. The system as recited in claim 1, wherein the first custom policy adjusts an anti-virus scan update setting based on priority of the anti-virus scan and impact on productivity determined from the telemetry information.

8. A method comprising:
    managing a plurality of information handling systems using a management service policy engine communicatively coupled to the plurality of information handling systems to manage the information handling systems using a plurality of policies, the plurality of policies including a current policy being used to manage a first information handling system (IHS) of the information handling systems;
    generating a first custom policy for the first IHS responsive to information received by the management service policy engine regarding the first IHS, the first custom policy replacing the current policy;
    managing the first IHS using the first custom policy;
    receiving telemetry information from the first IHS as at least part of the information received by the management service policy engine regarding the first IHS used to generate the first custom policy;
    determining, based at least in part on the telemetry information provided by the first IHS, a first time that the first IHS will be charging and idle for a length of time sufficient to receive a software update; and
    communicating with the first IHS to cause power settings on the first IHS to be adjusted to ensure that the first IHS is not sleeping just prior to the first time and to cause the first IHS to request the software update during the first time.

9. The method as recited in claim 8, further comprising:
    the management service policy engine generating as the first custom policy a software update policy and a power policy for the first IHS based on the telemetry information provided by the first IHS, the first custom policy to reduce impact on user productivity; and
    the management service policy engine creating a second custom policy for a second IHS, the second custom policy including a second software update policy and a second power policy based on second telemetry information provided by the second IHS, the second custom policy to reduce impact on productivity of a second user associated with the second IHS.

10. The method as recited in claim 8, further comprising: the first IHS requesting the software update during the first time.

11. The method as recited in claim 8, wherein generating the first custom policy further comprises:
    allowing access to a website that is blocked, responsive to, in part, the first IHS trying to access the website and based on one or more of user job function, user title, or active directory group; and
    notifying the first IHS that access to the website has been granted.

12. The method as recited in claim 11, wherein generating the first custom policy further comprises modifying a scan antivirus solution associated with the first custom policy prior to allowing access to the website.

13. The method as recited in claim 8, wherein generating the first custom policy further comprises changing a default browser from a first browser to a second browser.

14. The method as recited in claim 13, wherein generating the first custom policy further comprises disabling the second browser.

15. The method as recited in claim 8, wherein generating the first custom policy further comprises adjusting an anti-virus scan update setting based on priority of the anti-virus scan and impact on productivity determined from the telemetry information.

16. A system comprising:
    a plurality of information handling systems including a first information handling system (IHS) configured to supply telemetry information;
    a management service policy engine communicatively coupled to the information handling systems;
    the management service policy engine including a memory storing program instructions executable by at least one processing device of the management service policy engine to generate a custom policy for the first IHS responsive, at least in part, to the telemetry information, the custom policy overriding a current policy being used to manage the first IHS; and
    wherein the management service policy engine is configured to determine, based at least in part on the telemetry information, a first time that the first IHS will be charging and idle for a predetermined length of time sufficient to receive a software update, and the management service policy engine is configured to communicate with the first IHS to cause power settings to be set on the first IHS to ensure that the first IHS is not sleeping just prior to the first time and to cause the first IHS to request the software update during the first time.

* * * * *